(12) United States Patent
Wassermann et al.

(10) Patent No.: US 12,044,311 B2
(45) Date of Patent: Jul. 23, 2024

(54) LOCKING UNIT

(71) Applicant: SVM Schultz Verwaltungs-GmbH & Co. KG, Memmingen (DE)

(72) Inventors: Ralph Wassermann, Holzgünz (DE); Florian Hölzle, Illertissen (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 27 days.

(21) Appl. No.: 17/303,700

(22) Filed: Jun. 4, 2021

(65) Prior Publication Data

US 2021/0381594 A1  Dec. 9, 2021

(30) Foreign Application Priority Data

Jun. 5, 2020  (DE) .................. 10 2020 115 045.8

(51) Int. Cl.
*F16H 63/34* (2006.01)
*F15B 15/26* (2006.01)

(52) U.S. Cl.
CPC ......... *F16H 63/3483* (2013.01); *F15B 15/26* (2013.01)

(58) Field of Classification Search
CPC ..... F15B 15/26; F15B 15/261; F16H 63/3483
See application file for complete search history.

(56) References Cited

U.S. PATENT DOCUMENTS

| | | | | |
|---|---|---|---|---|
| 4,788,821 | A * | 12/1988 | Mienko | F16H 63/42 60/572 |
| 6,435,327 | B1 * | 8/2002 | Rohs | F16D 25/12 192/85.01 |
| 7,930,887 | B2 * | 4/2011 | Kondou | B60T 8/38 60/589 |
| 9,255,590 | B2 * | 2/2016 | Schuller | F15B 21/044 |
| 9,897,206 | B2 * | 2/2018 | Schuller | F16D 63/006 |
| 10,029,657 | B2 * | 7/2018 | Kidokoro | F16H 63/3483 |
| 10,288,093 | B2 * | 5/2019 | Marks | F16D 25/088 |
| 10,883,598 | B2 * | 1/2021 | Gebert | F16H 63/38 |
| 2013/0306894 | A1 * | 11/2013 | Wei | H01F 7/1607 251/359 |

* cited by examiner

*Primary Examiner* — Kenneth Bomberg
*Assistant Examiner* — Michael Quandt
(74) *Attorney, Agent, or Firm* — Scheef & Stone, LLP; Keith C. Rawlins (57) ABSTRACT

A locking unit for the parking lock of an automatic transmission, for locking the movement of a piston which is movable by a drive and which can be acted on with hydraulic pressure.

19 Claims, 6 Drawing Sheets

LOCKING UNIT

CROSS-REFERENCE TO RELATED APPLICATIONS

This application claims priority to German Patent Application No. 10 2020 115 045.8 filed Jun. 5, 2020, entitled "Locking Unit," which is incorporated by reference herein in its entirety.

FIELD OF THE DISCLOSURE

This disclosure relates to a locking unit.

BACKGROUND

A generic locking unit may be installed in the parking lock of an automatic transmission and prevent a vehicle from rolling away in an undesired manner. The locking unit may be connected to an external fluid system or to hydraulic surroundings, for which reason the fluid path also extends into the locking unit. Pressure peaks which may be several times greater than the operating pressure can be fed back from the hydraulic surroundings to the locking unit. Said pressure peaks may even amount to about 150 bar. It is characteristic that the pressure peaks amount to several times the operating pressure. This, however, has the effect that the locking unit and in particular the housing thereof must be configured for these high but seldom occurring pressure peaks. Stable walls of housings are therefore customary, wherein, in general, such housings are implemented for example by suitable material selection, for example normally expensive metal, or by design interventions, such as arrangements of ribs or stiffening arrangements. Such housings are, however, expensive to produce and can require increased structural space. The internal mechanical elements must also be configured for these pressure peaks. The existing technical difficulty (high pressure peaks) therefore cannot be eliminated using the customary technique (more stable housing walls) and in a satisfactory manner in the area of locking units for parking locks. This is the case if plastic is to be provided at least in certain sections as housing material, which is less expensive than metal and with which space-saving housings can be formed, but which has considerably lower stability with respect to pressure peaks.

SUMMARY

A locking unit, for locking the movement of a piston which is movable by a drive and which can be acted on with hydraulic pressure, comprises a housing, which is formed at least partially from plastic, and a pressure-conducting channel which is at least partially delimited radially to the outside, in relation to the longitudinal axis of the piston, by the inner wall of the housing and which serves for guiding a pressurized medium along a fluid path for the actuation of the piston by action on a pressure side in a pressure chamber.

BRIEF DESCRIPTION OF THE DRAWINGS

For a more complete understanding of this disclosure, reference is now made to the following description, taken in conjunction with the accompanying drawings, in which.

DETAILED DESCRIPTION

In the figures, identical or mutually corresponding elements are denoted in each case by the same reference designations and will therefore not be described again unless expedient. In order to avoid repetitions, features that have already been described will not be described again, and such features are applicable to all elements with the same or mutually corresponding reference designations unless this is explicitly ruled out. The disclosures in the description as a whole are transferable analogously to identical parts with the same reference designations or the same component designations. It is also the case that the situation terminology used in the description, such as for example up, down, laterally etc., relate to the figure presently being described and illustrated and, in the event of a change in situation, are to be transferred analogously to the new situation. Individual features or feature combinations from the various exemplary embodiments shown and described may furthermore also constitute independent inventive solutions or solutions according to the disclosure.

The disclosure is based on the object of creating a locking unit which overcomes the problems discussed herein, and the object of proposing a locking unit which, with an unchanged structural space requirement, exhibits improved protection against these high-pressure peaks and at the same time comprises a housing which is formed at least partially from plastic.

Therefore, a locking unit is disclosed, in particular for the parking lock of an automatic transmission, for locking the movement of a piston which is movable by a drive and which can be acted on with hydraulic pressure, comprising a housing, which is formed at least partially from plastic, and a pressure-conducting channel which is at least partially delimited radially to the outside, in relation to the longitudinal axis of the piston, by the inner wall of the housing and which serves for guiding a pressurized medium along a fluid path for the actuation of the piston by action on a pressure side in a pressure chamber, wherein at least one overpressure valve is provided which is fluidically connected to the pressure-conducting channel and the valve seat of which is formed integrally with the housing.

Contrary to the present trend toward increased housing wall thicknesses for the purposes of handling high pressure peaks, the disclosed locking unit can include at least one overpressure valve for this purpose. The overpressure valve is connected to the fluid path and is normally closed. However, as soon as the internal pressure in the housing overshoots a valve-dependent threshold value (threshold pressure), said overpressure valve opens and thus prevents the formation of an undesirably high internal pressure. This can yield numerous advantages. Firstly, individual components that are subjected to the fluid pressure can be of volume-optimized and/or weight-optimized configuration because they no longer have to withstand a no longer occurring pressure peak. They can therefore be configured with even less compromise in accordance with their actual purpose or for their actual function. Furthermore, the housing wall thickness can be considerably reduced, or the housing wall configuration can be adapted to the operating pressure as the highest pressure to be expected, because said housing wall thickness now no longer has to withstand high pressure peaks. Furthermore, the disclosed locking unit can be connected to fluid systems which do not have a fluid management system of their own. In particular, the locking unit according to the disclosure can now be directly connected to a hydraulic pump. This advantage is attainable with an unchanged structural space requirement.

A fluid can flow along the fluid path in both directions. The release of pressure may take place for example into a transmission sump.

In embodiments, the housing may be formed from plastic in the section that delimits the pressure-conducting channel. This has proven to be advantageous, in particular owing to the easy processability and the low weight of plastic, for example in relation to metallic materials. In some embodiments, the housing can be formed entirely from plastic. In this way, the housing can be particularly easily processed, and the weight can be particularly advantageously reduced. In combination with the proposed overpressure valve, it is thus possible to realize an even thinner housing wall thickness compared with a similar locking unit without overpressure valve.

In embodiments, the integral form of valve seat and housing may be formed by overmolding of the valve seat, by monolithic injection-molding of the valve seat or by joining of valve seat and housing. According to the first alternative, the valve seat may firstly be produced as a component separate from the housing, for example from plastic, and subsequently inserted into an injection mold and, as an insert part, overmolded with the housing in a corresponding injection molding process. This allows modular handling of valve seat and housing in accordance with a modular system, specifically because only a single injection mold is used for the housing, and different valve seats can be used as insert parts in accordance with requirements. According to the second alternative, the valve seat can be formed for the first time during the injection molding of the housing, specifically monolithically with the housing itself—from plastic. In this way, the insertion of insert parts into the injection mold can be avoided. Since the overpressure valve performs low numbers of switching operations during the operation of the locking unit, it is also the case that no significant wear occurs over the service life of the locking unit. The valve seat can therefore be formed from plastic and thus from a material which is softer than metal. Alternatively, the valve seat may be produced as a component which is initially separate from the housing, for example from plastic, and thereafter connected to the housing by a joining process (adhesive bonding, welding etc.). The valve seat is thus installed into the housing.

In an embodiment, at least one overpressure valve may be arranged in the fluid path upstream or downstream, in the direction of the pressure side, of a filter element for the fluid. The upstream arrangement has the advantage that, then, it is also the case that the filter element itself can be protected against high pressure peaks and the damaging effects thereof, because the pressure wave no longer reaches the filter element at all or reaches the filter element only with reduced intensity. The downstream arrangement has the advantage that only fluid that has already been filtered reaches the overpressure valve in question, and thus a malfunction owing to contamination can be prevented.

In embodiments, the at least one overpressure valve may, as a closure part, comprise a ball, a cone, a cylinder, a plate, a needle, or a diaphragm.

It is also conceivable for the closure part of the at least one overpressure valve to be spring-preloaded into the closed setting of the overpressure valve by at least one spring element. A spring-loaded overpressure valve can thus be realized. The spring element may for example be a helical compression spring or else a meandering spring, plate spring, star-shaped spring or leaf spring. The helical spring has the advantage that it can be arranged longitudinally with respect to the fluid direction of fluid flowing out of the overpressure valve, and can allow small as well as large stroke movements. The other springs mentioned can realize a very flat arrangement, wherein, it may be advantageous here that no very large stroke of the spring element is required in the valve.

In order to protect the overpressure valve itself against damage, the overpressure valve may have an opening travel delimitation for the closure part. The closure part is thus limited in terms of its freedom of movement. Upon an overshooting of the threshold value, the overpressure valve opens, or the closure part is adjusted along an adjustment travel, specifically at most to the extent allowed by the opening travel delimitation. In embodiments, the opening travel delimitation can have a delimiting element against which the closure part can abut in order to limit the opening travel. In some embodiments, the delimiting element can have a central channel running in an opening travel direction. The central channel can serve for the discharging of pressure and extend from one end side to the opposite end side of the delimiting element. The central channel may also receive a section of the spring element. In this embodiment, the spring element may be directly supported on the closure element.

In embodiments, the at least one overpressure valve may have a closure part guide element which guides the closure part along its adjustment travel. In embodiments, the closure part guide element can be able to have, or can have, fluid grooves running radially on the outside in the adjustment travel direction. The closure part guide element may, as an initially separate component, be overmolded with the housing, or alternatively, may be formed monolithically with the housing, or alternatively, may be fastened to the latter by joining. The webs formed between adjacent fluid grooves serve, at the inner circumference, for guiding the closure element and for securely holding the latter in the closed setting. The closure part guide element can therefore guide the closure part from the closed setting along a defined adjustment travel into the open setting, and vice versa, for defined centering with respect to the valve seat. This leads not only to reliable closure of the valve but also to fast closure, because the closing element is now guided directly to the valve seat. The closure part guide element may have uniformly spaced-apart webs which are arranged adjacent to one another in a circumferential direction with respect to the valve longitudinal axis and which protrude from an inner wall surface of a bore.

In embodiments, the locking unit may be configured such that the at least one overpressure valve is formed in the housing so as to be directly fluidically connected to a feed prechamber, the pressure-conducting channel or the pressure chamber. The fluid path may, proceeding from outside the housing, extend through a feed prechamber which is directly adjoined by a pressure-conducting channel into which the pressurized medium or fluid can flow in order to actuate the piston. For example, by way of leak-tightness, described further below, between tube piece and housing, the medium can advantageously be conducted to a position at which it is required for driving the piston. The pressure-conducting channel, which may extend along the longitudinal axis of the housing, can be adjoined by the pressure chamber in which the pressurized medium can act on the pressure side. The overpressure valve can now be arranged such that the valve inlet side is fluidically connected directly to at least one of feed prechamber, pressure-conducting channel and pressure chamber. An arrangement of the overpressure valve at a point located close to a feed opening is advantageous, such that an incoming pressure peak can likewise cause the opening of the overpressure valve directly and as early as possible. It is thus possible for the individual mechanical components of the locking unit to be of volume-optimized and/or weight-optimized design because the basis for dimensioning thereof is now the operating pressure, and no longer the highest pressure to be expected.

In embodiments, the at least one overpressure valve may be arranged opposite a feed opening in the housing. The spatial orientation of the overpressure valve toward the feed opening has the advantage that the overpressure valve is arranged in the flow direction, and an incoming pressure peak acts on the overpressure valve without further diversions. For example, the feed opening may be arranged so as to lead at one end into the feed prechamber and the overpressure valve may be arranged opposite the feed opening in relation to the space. The fluid path may furthermore lead at least in certain sections in the direction of the overpressure valve.

In embodiments, a wall thickness of the housing may be configured so as to be configured for hydraulic internal pressures of up to 30 bar; alternatively, of up to 25 bar; or alternatively, of up to 21 bar. The at least one overpressure valve leads to the advantageous effect that, now, the operating pressure can be selected as the basis for dimensioning for the wall thickness of the housing, and the highest pressure to be expected is no longer of significance. Specifically, the housing no longer needs to be able to withstand pressure peaks or pressure loads resulting from failures of a transmission system that is fluidically connected to the locking unit.

Figure 1A:
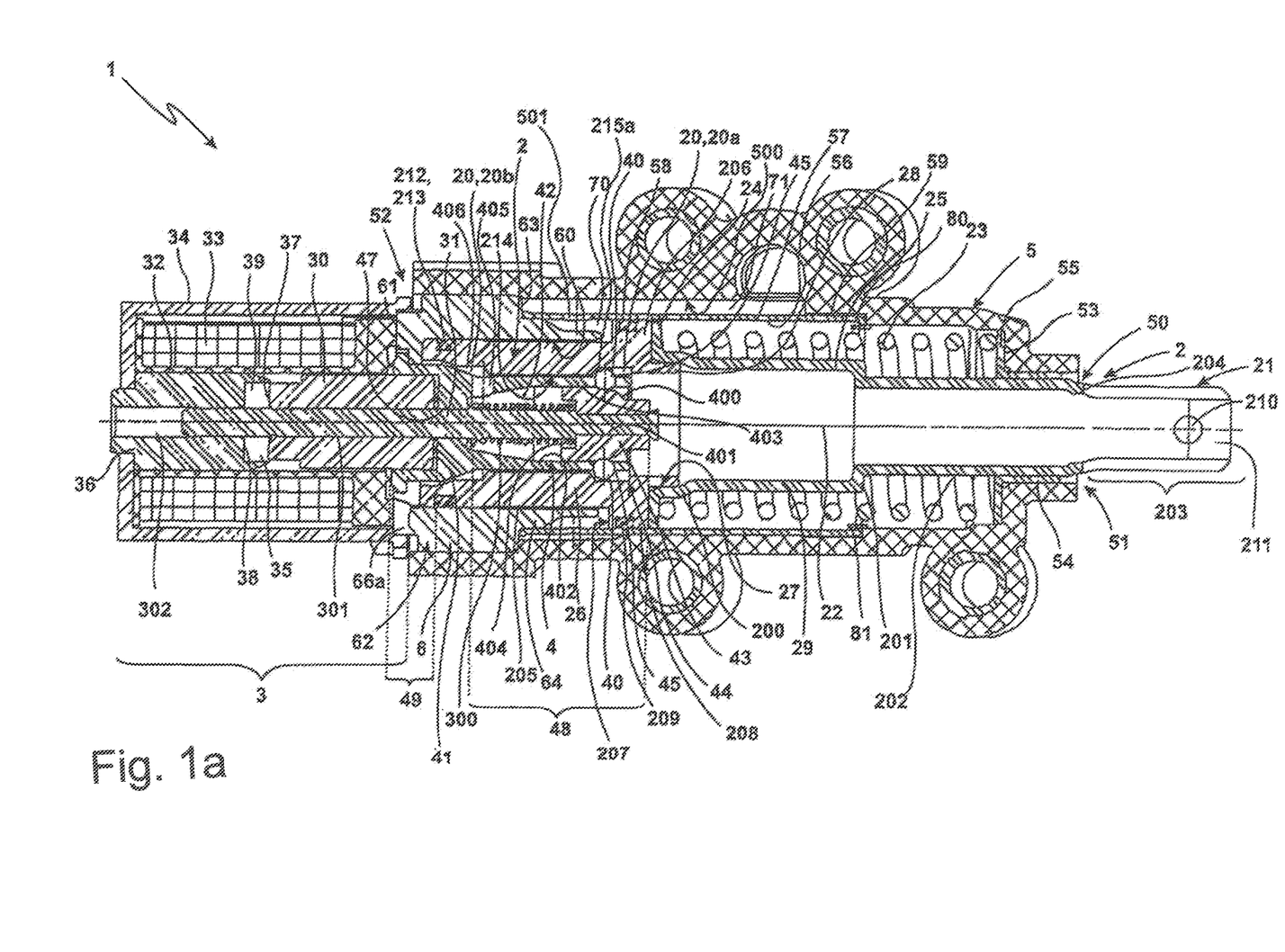
FIG. 1a illustrates a cross-sectional view of a locking unit according to the disclosure.
Figure 1B:
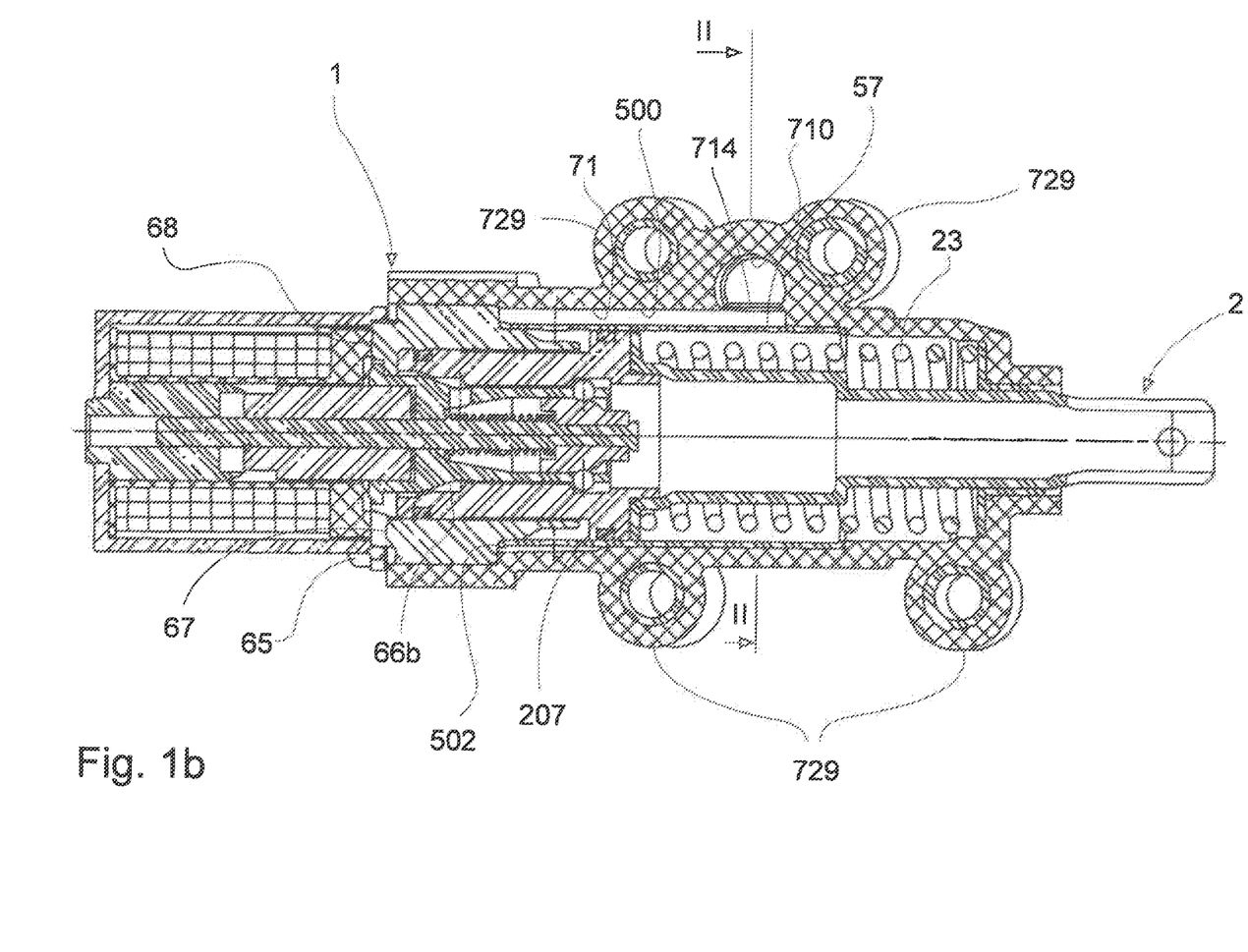
FIG. 1b illustrates the cross-sectional view of the locking unit of FIG. 1a, with further reference designations.

FIGS. 1a and 1b show identical cross-sectional views of an embodiment of the locking unit 1, but bear different reference designations for the sake of clarity. The locking unit 1 has a housing 5, at the front housing end 50 of which there is provided an opening 51 out of which the front end 21 of a piston 2 projects. At that housing end 52 which is situated opposite the opening 51, the housing 5 is adjoined, in an axial direction or longitudinal direction, by an electromagnet 3. Here, "axial direction" means either the axis of symmetry or a longitudinal axis 22 of the piston 2 or else the movement direction of the piston 2. In the housing 5, the piston 2 is mounted so as to be movable in the axial direction, in particular along its longitudinal axis 22. Here, a drive is provided for the movement of the piston 2, and in particular, the piston 2 can be acted on with pressure, for example, with hydraulic pressure, the force component of said pressure being directed counter to the direction of force of a piston spring 23. Here, the piston spring 23 is supported at one end on a housing shoulder or shoulder 53, which adjoins the housing end 50 at the inside, of the housing 5. At the other end, the piston spring 23 is supported on a flange ring 24 of the piston 2. Said flange ring 24 is situated in the interior, centrally in the housing 5.

The piston 2 moves, owing to the pressure, between multiple positions; in the variant shown here, two positions are provided by way of example. The situation of the piston 2 in the respective positions is fixable by a detent unit 4 which is equipped with detent elements 40. The electromagnet 3, or the elements thereof, serve(s) for the actuation of the detent unit 4, in particular for the detent elements 40 thereof. The electromagnet 3 has a coil body 32 which bears a winding 33. Said winding has a wire which can be flowed through by electrical current. The winding 33 is closed off radially to the outside (in relation to the longitudinal axis 22) by a magnet housing 34. A magnetic field arises as a result of an electrical energization of the winding 33.

An armature space is provided in the interior of the coil body 32, the armature space in the present case filling approximately half of the interior space of the coil body 32. Here, the armature space 35 is oriented in the direction of the piston 2. The remaining region of the interior space of the coil body 32 is filled by a magnet core 36 which, as is customary, is composed of magnetically soft material, which guides the magnetic field lines in an effective manner. In the armature space 35, there is situated an armature 30 which, in the exemplary embodiment shown here, is of cylindrical form and has a base surface 37. An air gap 39 forms between the base surface 37 and a terminating surface 38, which faces toward the armature space 35, of the magnet core 36.

When the winding 33 is not electrically energized, a magnet spring 300 pushes the armature 30 to the right (in relation to the plane of the image), such that the air gap 39 has its maximum extent. If the winding 33 is electrically energized, it generates a magnetic field which pulls the armature 30 to the left counter to the force of the magnet spring 300, such that the air gap 39 is closed. The armature 30 bears an armature rod 31. Here, the armature rod 31 is oriented concentrically with respect to the armature 30; armature 30 and armature rod 31 are mounted so as to be movable in an axial direction, that is to say parallel to the longitudinal axis 22, in the armature space 35. The construction is selected here such that the armature 30 has an axial bore 301 that receives the armature rod 31. Here, the armature rod 31 projects beyond the armature 30 to both sides of the latter. An axial bore 302 is likewise provided in the magnet core 36. The arrangement is selected such that a bearing arrangement for the armature rod 31 is situated in said axial bore 302. The armature space 35 is delimited on one side by the magnet core 36, wherein, as already described, the magnet core 36 fills that part of the interior space of the coil body 32 which is averted from the piston 2, and said magnet core 36 thus also describes the axial end of the electromagnet 3, but also of the locking unit 1, together with the magnet housing 34. On the other side, facing toward the piston 2, the armature space 35 is delimited by a yoke part 41 which is of pot-like design and which can be formed from a magnetically soft material in order to guide the magnetic field lines in an effective manner. Here, a part of the armature 30 protrudes into the yoke part 41 of pot-like design. The yoke part 41 is in this case a part of the detent unit 4. The yoke part 41 has a through bore 47 which receives and possibly also bears the armature rod 31. The detent unit 4 is substantially H-shaped as viewed in section. Here, the radially oriented web of the H forms the yoke part 41. This is adjoined by a first axial section 48 and a second axial section 49. The two axial sections 48, 49 of the H, which adjoin the web to both sides of the latter, are of different size or different length, wherein the section 49 facing toward the armature space 35 is axially considerably shorter than the section 48 facing toward the piston 2. Here, in the present case or in typical embodiments, the larger section 48 is about 2 to 3, 3.5 or 4 times larger or longer than the smaller section 49. In the foot region, facing toward the yoke part 41, of the sleeve-like first axial section 48, there is arranged an equalizing opening 405 which runs radially (in relation to the longitudinal axis 22). Said equalizing opening 405 fluidically connects an interior space 42 to an exterior space 406 in which a piston thrust piece 26 of the piston 2 moves axially. A pressure equalization between the interior space 42 and the exterior space 406 is possible through the equalizing opening 405.

The two sections 48, 49 radially adjoin in each case one corresponding receiving space. Here, the smaller, second section 49 delimits the armature space 35 (this is the pot-like yoke part 41), and the larger section 48 delimits the interior space 42. Here, the interior space 42 extends in the axial direction. Also provided in the interior space 42 is the magnet spring 300 which, at one side, is supported on the upper side, facing toward the second section 49, of the yoke part 41 and which, at the other side, is supported on a control element 43 which is arranged at an end side on the armature rod 31. Here, the control element 43 is arranged in a positionally fixed manner on the armature rod 31. The control element 43 also has a receiving bore 401, into which the armature rod 31 is inserted. The control element 43 is pressed together with the armature rod 31 in a suitable manner and thus held on the latter in a positionally accurate manner. The control element 43 is composed substantially of two different geometric bodies, a cylinder section and a cone section, wherein the cone section, on its lateral surface, forms a cone surface 400. A lateral surface 403 of the cylinder section of the control element 43 is guided and possibly also mounted on an interior space wall 402 which radially delimits the interior space 42. At that axial end of the control element 43 which faces toward the electromagnet 3, there is situated an annular cutout 404 in which the end of the magnet spring 300 is seated and is thus reliably guided and held. The cone surface 400 is situated at that end of the control element 43 which is situated opposite the cutout 404.

Other constructions are also possible for the configuration of the control element 43. For example, it is also conceivable that the cone surface is arranged on the control element on the side facing toward the electromagnet 3, and the functioning of the locking unit 1 is then possibly altered. The illustrated locking unit 1 is planned such that, when the electromagnet is electrically deenergized, that is to say when the winding 33 is electrically deenergized, the control element forces the detent elements 40, which in the present case are in the form of balls, radially outward and thus blocks the piston 2. Blocking of the movement of the piston 2 may however also take place when the electromagnet 3 is electrically energized. Here, according to the proposal, the situation of the air gap 39 is also variable. In the exemplary embodiment shown in FIG. 1a, the air gap 39 is situated on that side of the armature 30 which is averted from the detent unit 4, that is to say between armature 30 and the magnet core 36. As an alternative to this, it is also possible that the air gap is then formed between the armature 30 and the yoke part 41, that is to say that side of the armature 30 which faces toward the detent unit 4.

The arrangement of the magnet spring 300 in the interior space 42 is advantageous because, in this way, these elements do not impair the magnetic circuit that is formed in the elements around the armature space 35. Alternatively, an arrangement of the magnet spring in the armature space or else outside the detent unit 4 is also possible in order to form a corresponding force accumulator. In the event of an electrical energization of the winding 33, the air gap 39 closes by virtue of the armature 30 being displaced to the left, whereby the armature rod 31 and the control element 43 borne by the armature rod 31 are also displaced to the left, whereby the magnet spring 300 is compressed and thus forms a force accumulator for a resetting movement of the unit composed of armature 30, armature rod 31 and control element 43 upon deactivation of the electrical energization of the winding 33.

The larger, first section 48 of the detent unit 4 bears, at its end or end region 44 averted from the yoke part 41, the one or more detent elements 40, which in the present case are in the form of balls. Here, the larger section 48 is (at least in the end region 44) of sleeve-like or cylinder-like form. The detent elements 40 are provided as balls 40 in a ball cage. The sleeve-like or cylinder-like end region 44 of the section 48 has bores 45 which in this case are oriented radially (in relation to the longitudinal axis 22) and which serve for receiving the detent elements 40 or balls. Depending on the axial setting of the control element 43, it is possible that the detent elements 40 or balls can or cannot deflect radially inward.

In the locking unit 1 that is shown, the piston 2 is composed of two individual parts. The piston 2 comprises a piston tube 25, which partially projects out of the opening 51, and the piston thrust piece 26, which is produced separately from said piston tube 25. Here, the arrangement is selected such that the piston thrust piece 26, in the housing 5, adjoins the inner end of the piston tube 25. The piston tube 25 is completely hollow on the inside. Said piston tube can be formed as a deep-drawn part, for example from metal such as for example tool steel or the like, whereby the production of such an element is made considerably cheaper. Therefore, in the present case, the wall thickness of the piston tube 25 also amounts to only about 5 to about 15 percent of the diameter of the piston tube 25, or of the outer diameter of individual parts (for example inner end 27, first tube middle piece 29, second tube middle piece 202 and connecting region 203) of the piston tube 25. The piston tube 25 lies with its flange ring 24, provided at the end side, against the piston thrust piece 26. The flange ring 24 thus forms a delimiting surface, which is oriented radially (in relation to the longitudinal axis 22), of the piston tube 25. Said inner end 27, which also comprises the flange ring 24, is mounted onto the connecting ring 28, which terminates the piston thrust piece 26 in the direction of the piston tube 25. A relatively accurate fit can be provided here, and it is for example thus possible for the piston tube 25 to be pressed onto the piston thrust piece 26. Other connecting methods, such as for example welding, brazing or else adhesive bonding, of the elements piston tube 25 and piston thrust piece 26 are self-evidently also alternatively possible. The end 27 then transitions into a narrowing 200 into a first tube middle piece 29, that is to say the diameter of the piston tube 25 is smaller in the region of the first pipe middle piece 29 than in the region of the end 27. Then, at a further, second narrowing 201 in the form of a shoulder, the first tube middle piece 29 adjoins the second tube middle piece 202. The diameter of the piston tube 25 is smaller in the region of the second tube middle piece 202 than in the region of the first tube middle piece 29. Said second narrowing 201 forms a stop.

The piston 2 is guided in a plain bearing 54. The latter has an inner flange 55. If the piston 2 is displaced to the right, the movement is limited by virtue of the fact that the shoulder-like narrowing 201 lies against the radially acting inner flange 55 of the plain bearing 54. The plain bearing 54, mentioned immediately above, for the piston tube 25 is provided on the inner side of the opening 51 of the housing 5. The second tube middle piece 202 is mounted on said plain bearing 54. The plain bearing 54 has the inner flange 55 which is oriented into the housing interior and which also forms the shoulder 53 in said region. Since the housing 5 can be composed of plastic, said part is correspondingly overmolded. It is however also possible for the plain bearing 54 to be inserted into a separately produced, for example injection-molded, housing 5, for example a plastics housing. Here, that is to say in the region of the opening 51 and of the embedding of the plain bearing 54 into the housing 5, relatively high accuracy can be expedient.

In the setting of the locking unit 1 shown here, the piston 2 has been pushed fully into the housing 5, and only the end-side connecting region 203 of the piston 2 is projecting out of the housing 5. Further elements (not shown here) that are moved or held by the piston 2 are connected to the piston 2 in the connecting region 203. Here, the second tube middle piece 202 transitions into the connecting region 203 at the third narrowing 204.

As already stated, all axial sections, that is to say the inner end 27, the first narrowing 200, the first tube middle piece 29, the second narrowing 201, the second tube middle piece 202, the third narrowing 204 and the connecting region 203, are hollow on the inside. It is to be noted that the connecting region 203 has a recess provided at the central plane, that is to say is slotted. A fork-like structure of the connecting region 203 is formed, wherein remaining half-shells 211 of the connecting region 203 nevertheless provide sufficient stability for the connection to a further element which is not illustrated in any more detail.

To receive a fastening bolt or the like, in each case one bore or other through opening 210 is provided in the half-shell 211. The piston thrust piece 26 is likewise of substantially sleeve-like, that is to say internally hollow form. Its outer surface 205 serves for guidance. At the front end facing toward the piston tube 25, an outer ring 206 is provided on the piston thrust piece 26. The outer surface of said outer ring 206 is mounted, or at least guided, on a housing inner wall 56. The outer ring 206 lies in an axial direction (in relation to the longitudinal axis 22) against the flange ring 24 of the piston tube 25. A pressure side 207, averted from the flange ring 24, of the outer ring 206 is acted on with pressure, for example, with hydraulic pressure, and is therefore also of correspondingly solid form.

Here, an annular pressure chamber 70 is provided. In embodiments, the piston thrust piece 26 can be a turned part. In some embodiments, the piston thrust piece 27 can be composed of tool steel. An encircling shoulder 208 is provided radially at the outside on the pressure side 207, which shoulder 208 receives an O-ring seal or a sealing ring 209. Since said O-ring seal or the sealing ring 209 is subjected to the hydraulic pressure, it is also pressed in a radial direction and thus reliably closes any remaining gap between the radial outer surface of the outer ring 206 and the housing inner wall 56.

A middle piece 6 is furthermore provided. The middle piece 6 is likewise of sleeve-like form and, at its inner side, forms a bearing surface 60 for the piston thrust piece 26. Here, the bearing surface 60 interacts with the lateral surface or outer surface 205 of the piston thrust piece 26. The middle piece 6 is positionally fixed in the locking unit 1. For example, the middle piece 6 is provided as a turned part and is composed of a customary tool steel. In another embodiment, the middle part 6 can be in the form of a sintered formed part or is manufactured in a formative process, in particular by 3D printing, metal powder injection molding, selective laser melting or selective laser sintering. Sintering or formative manufacturing are inexpensive production methods with which workpieces of virtually any desired shape can also be produced in a single working step. The middle piece 6 has an axial length (in relation to the longitudinal axis 26) dependent on other components of the proposed locking unit 1. The axial length of the middle piece 6 corresponds in the present case to about 100-200% of the stroke of the piston 2; alternatively, about 130-170% of the stroke of the piston 2. The axial length of the middle piece 6 corresponds in the present case to about 20-50% of the axial length of the piston 2; alternatively, about 30-40% of the axial length of the piston 2. The axial length of the middle piece 6 corresponds in the present case to about 10-30% of the axial length of the locking unit 1; alternatively, about 13-20% of the axial length of the locking unit 1.

Here, the outer surface 205 is the lateral surface of a cylinder. At its end averted from the piston tube 25 and facing toward the electromagnet 3, the outer surface 205 bears a further O-ring seal 213 in a circumferential groove 212. Said O-ring seal 213 seals off the gap which remains between the outer surface 205 and the bearing surface 60, and which is under pressure, in the direction of the electromagnet 3.

The piston 2 shown in FIGS. 1a and 1b is composed of the two components, the piston tube 25 and the piston thrust piece 26, which in the variant shown here are mechanically fixedly connected to one another, for example by being mounted on one another or pressed together. Said components may however alternatively also be configured in floating fashion with respect to one another, that is to say may be pressed against one another only owing to the action of force of the applied pressure, on the one hand, and owing to the oppositely directed force of the piston spring 23, on the other hand. Said piston 2 composed of two components is firstly mounted on the bearing surface 60 of the middle piece 6 by way of the piston thrust piece 26. A further mounting is alternatively provided at the outer ring 206 of the piston thrust piece 26 in interaction with the housing inner wall 56. The second tube middle piece 202 of the piston tube 25 is ultimately mounted on the plain bearing 54 provided at one side. An inner surface 214 of the piston thrust piece 26 is also not of smooth form, but rather has hollows or detent receptacles 20, 20a, 20b at each end side, that is to say spaced apart from one another axially (in relation to the longitudinal axis 22). The diameter of the annular hollows or detent receptacles 20, 20a, 20b is in this case larger than the diameter of the inner surface 214 situated between them.

The detent receptacles 20, 20a, 20b are turned into the inner surface 214 of the sleeve-like piston thrust piece 26 as a shoulder or internally situated shoulder. The detent unit 4 is arranged in a positionally fixed manner in the housing 5; the piston 2 is configured to be movable axially or longitudinally relative to the detent unit 4. In the setting shown in FIGS. 1a and 1b, however, the movement of the piston 2 to the right, in the direction of the opening 51, is blocked by the detent unit 4; the locking unit 1 is blocked in the retracted position of the piston 2.

As already mentioned, the detent unit 4 has detent elements 40, in this case for example balls 40 of a ball cage, which are each mounted in bores 45 so as to be radially movable (with respect to the longitudinal axis 22). The electromagnet 3 is shown in a deenergized position, that is to say no electrical current is applied to the winding 33.

Therefore, the air gap 39 forms between the armature 30 and the magnet core 36, because the magnet spring 300 displaces the armature 30, and thus also the control element 43 on which the magnet spring 300 is indeed supported, to the right. The control element 43 thus moves to the axial position of the detent elements/balls 40, such that the cone surface 400 of the control element 43 acts on the detent elements/balls 40 and pushes these radially outward (in relation to the longitudinal axis 22) into the respective detent receptacles 20, 20a. Then, however, a longitudinal movement of the piston 2, that is to say a movement of the piston 2 to the right, is blocked, because a first inner shoulder 215a which delimits the detent receptacle 20, 20a lies against the radially outwardly displaced detent elements 40. The first inner shoulder 215a is in this case situated at the first detent receptacle 20a at the side facing toward the second detent receptacle 20b.

In the setting shown in FIGS. 1a and 1b, it is furthermore the case that that end of the piston thrust piece 26 which is averted from the piston tube 25 is lying against a radially running stop surface 61 of the middle piece 6, and thus also blocking a movement of the piston 2 to the left, in the direction of the electromagnet 3.

This end setting is on the one hand delimited by the abutment of the second narrowing 201 against the inner flange 55 of the plain bearing 54 in the region of the opening 51 of the housing 5. In this setting, it is in turn the case that the electromagnet 3 is deactivated, that is to say no electrical current is applied to the winding 33, whereby the control element 43 pushes the detent elements/balls 40 into the outer or second detent receptacle 20, 20b of the piston thrust piece 26 and thus on the other hand blocks a movement to the left. The radially outwardly pushed detent elements/balls 40 then lie against a second inner shoulder 215b, which delimits the second detent receptacle 20b. The second inner shoulder 215b is in this case situated at that side of the second detent receptacle 20b which faces toward the first detent receptacle 20a. As already described, the two detent receptacles 20a and 20b are spaced apart from one another axially (in relation to the longitudinal axis 22).

The piston 2, in particular the piston thrust piece 26, is mounted movably between the detent unit 4, arranged radially at the inside, and the middle piece 6, arranged radially at the outside. The middle piece 6 assumes a central position in the locking unit 1 in the embodiment shown. On one hand, it bears the sleeve-like housing 5 on its radial outer side 62. On the other hand, it however also produces a connection to the electromagnet 3, in particular to the magnet housing 34 thereof. In FIG. 1b, in the lower region, it is possible to see a radially running gap 65 between the magnet housing 34 and the housing 5, which gap 65 extends radially inwardly into a channel 66a which is in fluidic contact with an intermediate space 66b formed between the thrust piece 26 and the detent unit 4. The radially running channel 66a is in this case implemented such that a cutout 67 is provided at a foot region 68, facing toward the electromagnet 3, of the middle piece 6, and thus the foot region 68, facing toward the electromagnet 3, of the middle piece 6 does not lie fully circumferentially against the flange part of the coil body 32. The fluidically coherent elements intermediate space 66b, channel 66a and gap 65 allow ventilation of the interior of the locking unit 1.

Furthermore, the middle piece 6 provides for radial alignment of the electromagnet 3 with respect to the detent unit 4. It is expedient to realize a high degree of concentricity in this region. The middle piece 6, at its side averted from the electromagnet 3 and facing toward the piston tube 25, has an encircling abutment shoulder 63, which is then adjoined by an annular and/or conical connecting region 64. Said connecting region 64 is a constituent part of the middle piece 6. Here, the connecting region 64 performs multiple tasks. Firstly, it supports a tube piece 57, which can also be referred to as sleeve piece, which is a part of the housing 5 and which, on its inner side, provides the housing inner wall 56. Furthermore, at least a part of the connecting region 64 delimits the pressure chamber 70, that is to say is in contact with the pressurizable medium. For this purpose, the tube piece 57 is pushed or pressed onto the annular region of the connecting region 64. As already described, the piston 2, in particular the piston thrust piece 26, lies against the housing inner wall 56, and in this respect the tube piece 57 has the characteristics of a cylinder. The tube piece 57 can delimit or conduct the pressure of the fluid for the adjustment of the piston 2 not only at its housing inner wall 56 but also at its tube outer side 58. The mounting of the first end piece of the tube piece 57 on the middle piece 6 emphasizes the central importance of the middle piece 6 in the embodiment shown here. The second end piece of the tube piece 57 is mounted in the housing 5, and the inner side of the tube piece 57 serves as a mounting or guide of the piston 2.

In the present embodiment, the tube piece 57 is, at the right-hand side, connected in fluid-tight fashion to the housing 5. This is accomplished by virtue of the tube piece 57 being pushed into a groove 80 of the housing 5. Here, the groove 80 is of annular form and is delimited radially on the inside by a projection 81 of the housing 5. Owing to the fluid-tight connection, it is ensured that pressurized fluid that is situated in the pressure-conducting channel 71 does not pass the connecting point between housing 5 and tube piece 57 into a region radially to the outside of the piston tube 25, which would counteract a movement of the piston 2 to the right, which is specifically what is intended to be achieved by the pressurized fluid, as described below.

On the housing 5, in the region of the tube middle piece 29, there are arranged four eyelet-like fastening receptacles 729, wherein the fastening receptacles 729 are situated diametrically oppositely in relation to the housing 5. The fastening receptacles 729 are formed monolithically with the housing 5 and can each be extended through by a screw in order for the housing 5 to be positionally fixed. Between the two fastening receptacles 729 that are shown above in the plane of the image, there is arranged a feed prechamber 710, which is likewise formed monolithically in the housing 5 and which has a feed opening 712. On the housing 5, and connected to the feed opening 712, there is a pressure connection (not illustrated in any more detail) which provides a pressurized medium as a drive source for the piston 2. Said pressure connection can be arranged in that half of the housing 5 which faces toward the opening 51.

Figure 2:
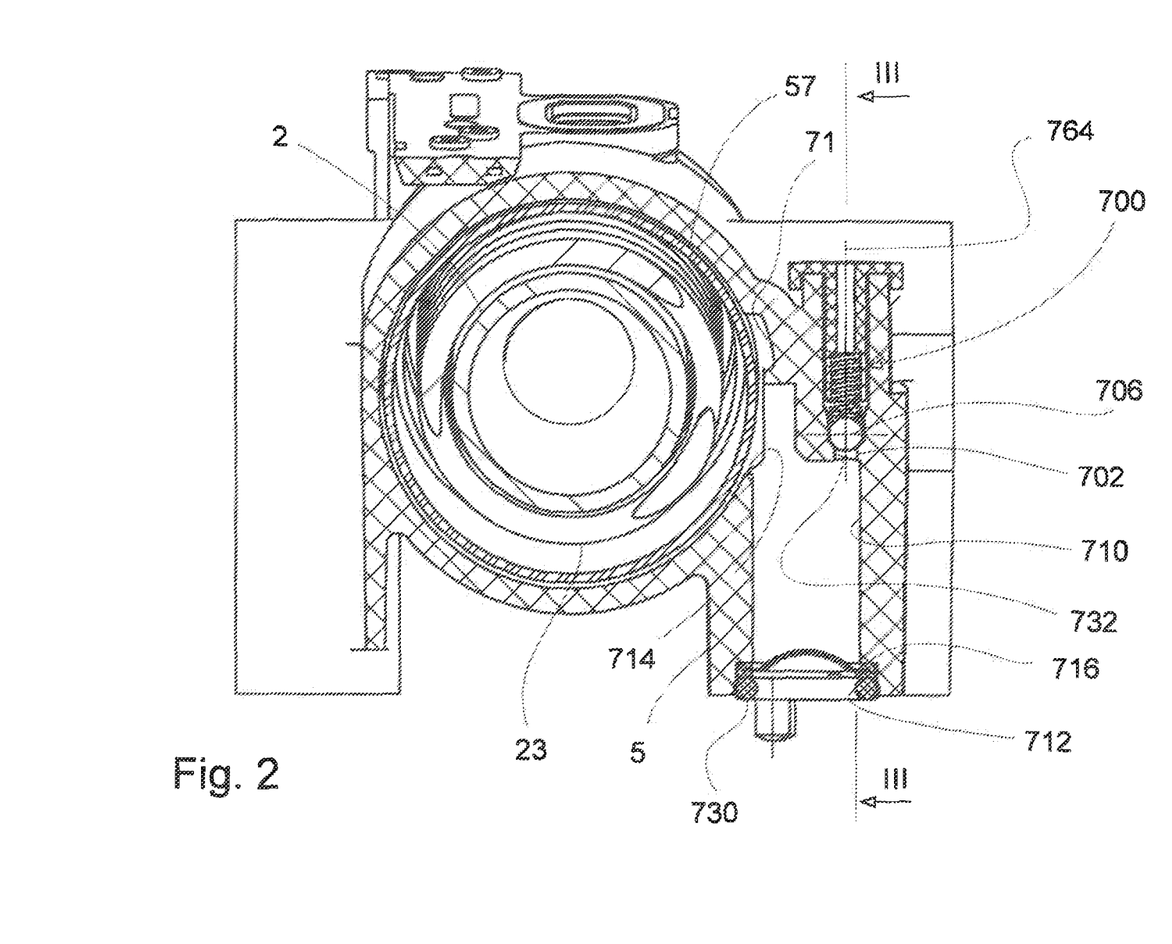
FIG. 2 illustrates another cross-sectional view of the locking unit of FIG. 1b, taken along sight line II-II of FIG. 1b.

FIG. 2 shows that the medium can flow into and out of the housing 5 via the feed opening 712, which comprises an O-ring seal 730 and a filter element 716. The feed prechamber 710 is of cubic form and extends tangentially with respect to that section of the housing 5 which surrounds the piston 2. Along the fluid path, the medium can flow from the feed prechamber 710 into the pressure-conducting channel 71 via an inlet opening 714. The inlet opening 714 is oriented tangentially to that section of the housing 5 which surrounds the piston 2, such that the fluid path in said region runs radially with respect to the longitudinal axis 22.

In order to now realize the greatest possible stroke of the piston 2, the pressure side 207, which can be acted on with pressure, of the piston thrust piece 26 must be as far remote from the opening 51 as possible in the retracted position of the piston 2. This boundary condition has the effect that, in the housing 5, or in the locking unit 1, the pressurized medium must firstly be conducted counter to the movement direction (the working movement realized by the action of pressure, to the right in FIG. 1a) of the piston 2, in order to then be diverted at a suitable point and guided onto the pressure side 207. The pressure connection (not shown) is thus fluidically connected to the pressure-conducting channel 71, which runs substantially axially (in relation to the longitudinal axis 22). Said pressure-conducting channel 71 is delimited radially to the inside by the outer side 58 of the tube piece 57 and radially to the outside by the plastics housing 5, in particular the inner wall 500 thereof. The pressure-conducting channel 71 may surround the entire tube piece 57 (in relation to its circumferential direction) or may extend axially only in one segment, as shown in FIGS. 1a and 1b.

Since the tube piece 57 is mounted fixedly, and therefore also in sealed or pressure-tight fashion, on the connecting region 64 of the middle piece 6, an aperture 501 is provided in the tube piece 57 at the axial level of the connecting region 64 in relation to the longitudinal axis 22, through which aperture the pressurized medium passes from the pressure-conducting channel 71 into the pressure chamber 70 on the inner side of the tube piece 57. The tube piece 57 thus performs a multiplicity of tasks. Its housing inner wall 56 serves as a guide or mounting of the piston 2. Its outer side 58 serves at least partially as pressure-conducting channel 71. Furthermore, the tube piece 57 supports or stiffens the housing 5, which can be composed of plastic. This combined construction of the housing 5 combines a low mass and inexpensive production with high wear resistance and therefore high availability of a locking unit thus equipped. The tube piece 57 is, at its end 59 averted from the connecting region 64, surrounded annularly by the plastics material of the housing 5. Therefore, the pressure-conducting channel 71 does not imperatively extend over the entire axial length of the tube piece 57. For example, the tube piece 57 may be overmolded by the plastic of the housing 5, or alternatively, the tube piece 57 may for example be inserted or pressed into a housing 5 produced in a separate manufacturing step.

As already stated, there is a fluidic connection between the pressure-conducting channel 71, which is arranged on the radial outer side of the tube piece 57, and the pressure chamber 70, which is arranged on the radial inner side of the tube piece 57. In the example shown in FIGS. 1a and 1b, this connection is realized by the aperture 501 in the tube piece 57. That end 502 of the tube piece 57 which faces toward the middle piece 6 is in this case pushed fully onto the connecting region 64 and lies tightly (and thus also sealingly) against the radially outwardly running abutment shoulder 63.

Figure 3:
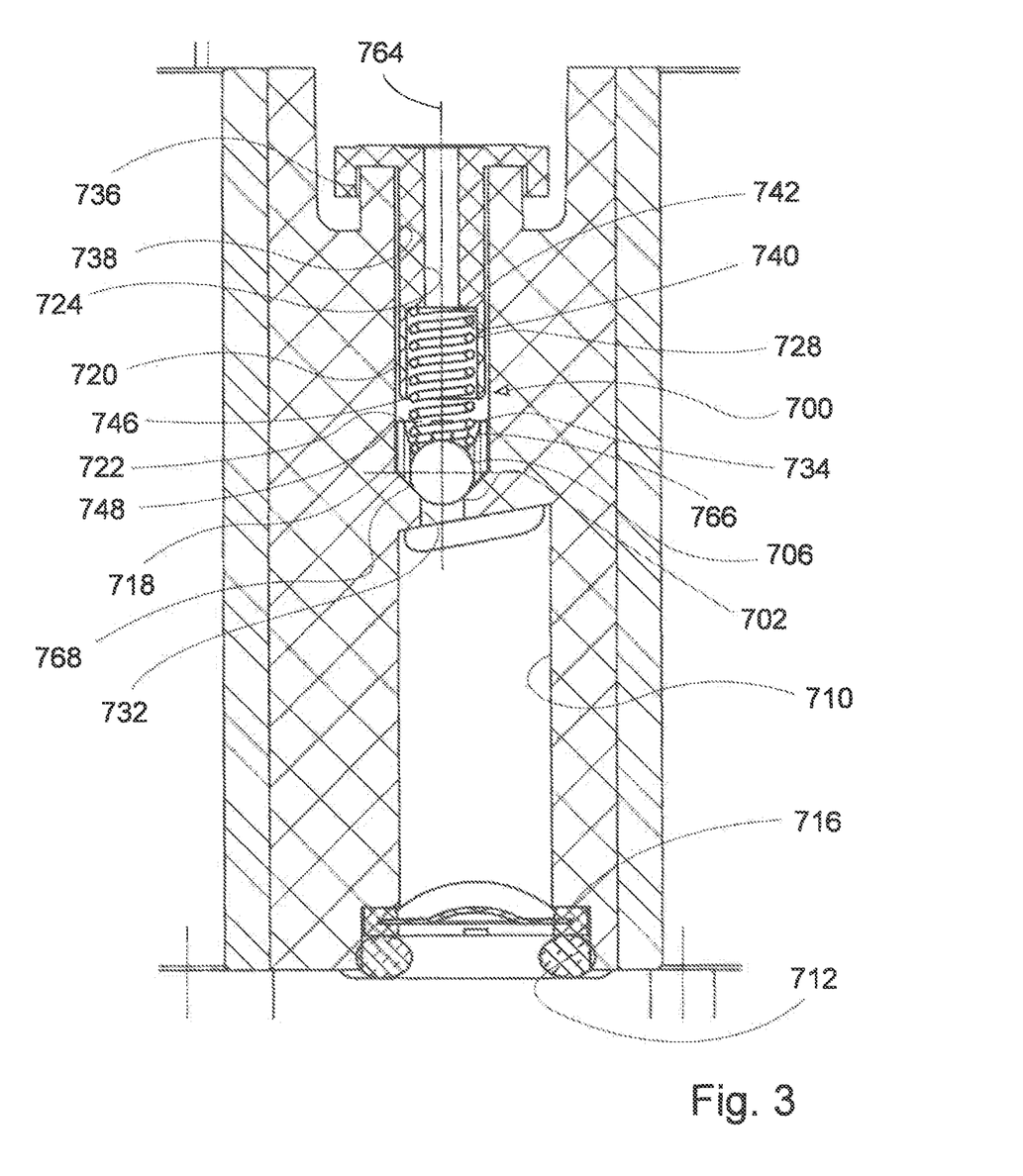
FIG. 3 illustrates a cross-sectional view of a feed prechamber of the locking unit of FIG. 2, taken along sight line in FIG. 2.

FIG. 3 now shows, in detail, a cross section of an overpressure valve 700 which is formed on the housing 5 and which is extended through by a valve longitudinal axis 764. The overpressure valve 700 is, in FIGS. 1a to 4, in the form of a spring-loaded check valve and has a valve seat 702 which is formed monolithically with the housing 5 or which has been jointly formed in the injection molding process for the housing. An overpressure opening 732, which is fluidically connected to the feed prechamber 710 and which constitutes a part of a bore 738, leads through the valve seat 702. The overpressure valve 700 is thus also fluidically connected to the pressure-conducting channel 71. The overpressure opening 732 is normally held closed by a ball 706 as closure part, which ball is guided in the longitudinal direction of the overpressure valve 700 or along the valve longitudinal axis 764 by a closure part guide element 718. For this purpose, the closure part guide element 718 has radially running webs 734, wherein adjacent webs 734 enclose in each case one interposed fluid groove 722. Each fluid groove 722 extends in an opening travel direction. The webs 734 formed between adjacent fluid grooves 722 serve, on the inner circumference, for guiding the closure element along its adjustment travel. The webs 734 are uniformly spaced apart and are arranged adjacent to one another, in the circumferential direction with respect to the valve longitudinal axis 764, in the bore 738. The webs 7 protrude into the bore 738 from the inner wall surface of the latter. The ball 706 is loaded into the closed setting with a spring force by a spring element 728 in the form of a helical compression spring, which is supported at one end on the ball 706. At the other end, the spring element 728 is supported on a delimiting element 720. The spring force is transmitted to the ball 706 and said ball 706 closes against the valve seat 712, these together ensuring the sealing action. This state is maintained for as long as the spring force is greater than the opposing force of the medium, which arises as a result of the pressure of the medium at the inlet of the valve or at the overpressure opening 732. If the media pressure exceeds the spring force, the ball 706 is displaced counter to the spring force into the open position, and the pressure can escape from the housing 5. The ball 706 lifts off from the valve seat 702 and opens up a gap between itself and a cone surface 768, through which gap the pressure can escape into the fluid grooves 722. The ball is adjusted along the adjustment travel into an open setting at most to such an extent that the spring element 728 is fully compressed. However, it is normally the case that even short strokes are sufficient to intercept pressure peaks. If the opposing force of the medium falls below the spring force, then the spring element 728 forces the ball 706 back in the direction of the valve seat 702, specifically in a manner guided and centered by the webs 734. Each web 734 has, on its side situated opposite the valve seat 702, a run-in bevel 766 which runs in the direction of the valve seat 702. The run-in bevels 766 serve for centering the spring element 728 and the ball 706 with respect to the valve longitudinal axis 764.

The delimiting element 720 is formed as an element separate from the housing 5 and is fastened to the latter by way of a connection 736. The delimiting element 720 may be formed from plastic. The connection 736 may be a screw connection, a welded connection, an adhesively bonded connection or the like. The delimiting element 720 has, along its longitudinal axis, a central channel 724 which runs in the opening travel direction and which serves for the discharging of the pressurized medium. Said medium can for example be conducted to a transmission sump 726 and thus fed back to the hydraulic circuit. To receive a section of the spring element 728, the second delimiting element 720 has a receiving space 740 and, to support the spring element 728, the delimiting element 720 has an annular surface 742. The annular surface 742 connects the central channel 724 to the receiving space 740.

The overpressure valve 700 has an opening travel delimitation for the ball 706. For this purpose, the second delimiting element 720 serves, by way of its end surface 746, as a stop for the first delimiting element 718 with its end surface 748. The closure part or the ball 706 is thus delimited in terms of its freedom of movement. Upon an overshooting of the threshold value, the overpressure valve 700 opens, or the ball 706 is moved into the open position, specifically at most to the extent allowed by the opening travel delimitation.

The feed opening 712 leads at one end into the feed prechamber 710, wherein the overpressure valve 700 is arranged opposite this. The feed prechamber 710 has an oblique ceiling profile, wherein the overpressure opening 732 is arranged in that part of the ceiling profile which is closer to the feed opening 712. Since, along the fluid path in the direction of the pressure side 207, the medium firstly passes the filter element 716, the overpressure valve 700 is arranged downstream of or after said filter element 716.

Figure 4:
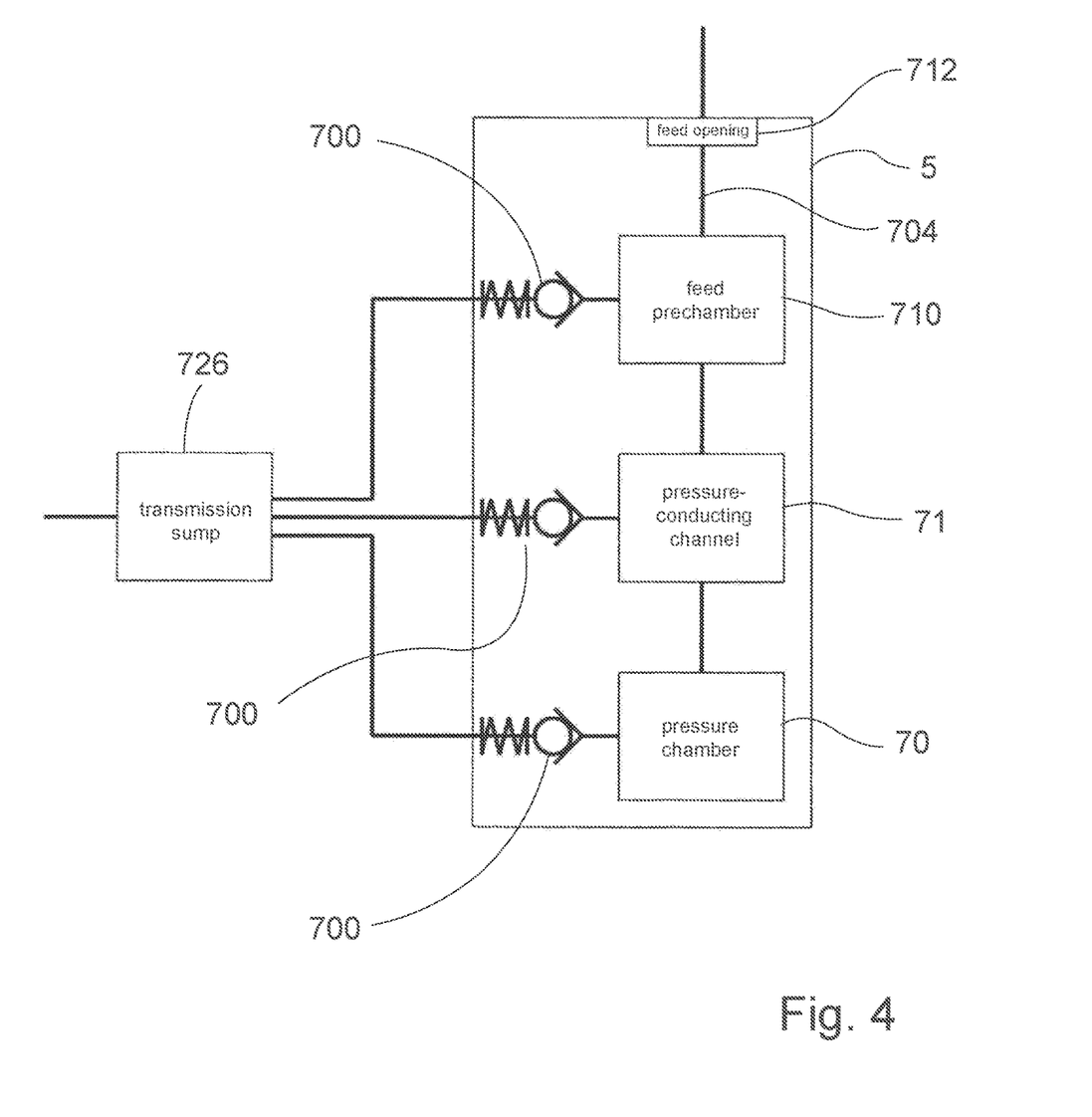
FIG. 4 illustrates a schematic diagram of a hydraulic circuit diagram of the locking unit.

FIG. 4 illustrates a schematic diagram of an embodiment of a hydraulic circuit diagram for the described locking unit 1. The fluid path 704 is illustrated, which extends, proceeding from outside the housing, through the feed opening 712, the feed prechamber 710, the pressure-conducting channel 71 into the pressure chamber 70 with the pressure side 207. The locking unit 1 may now be configured such that the at least one overpressure valve 700 is formed in the housing 5 so as to be directly fluidically connected to the feed prechamber 710, the pressure-conducting channel 71 or the pressure chamber 70. An overpressure valve 700 may thus be located at one of these points. It is however possible for more than one overpressure valve 700 to be provided.

FIGS. 5a to 5f illustrate various perspective views of embodiments of the spring element of the overpressure valve. The guidance of a plate 708 is achieved by virtue of a spring element 744 being provided which is fixable in a suitable manner to the sealing seat and which, in the middle or symmetrically or centrally, bears the plate 708 as sealing element. Here, there are a large number of different variants for the configuration of the spring element 744. In the exemplary embodiment shown here in FIG. 5a, it is for example the case that the plate 708 as sealing element has been molded on in the middle region, described as receiving region 750, of the spring element 744, wherein, in this region, the spring element 744 has corresponding apertures through which the (elastic) injection-moldable material of the sealing element protrudes and forms and in particular positively locking connection to the spring element 744. The spring element 744 allows mobility of the sealing element in a movement direction that is parallel to the movement 33 of the contact body 3. The spring element 744 and the sealing element are arranged, and thus guided and also protected, in the bore 738.

Figure 5A:
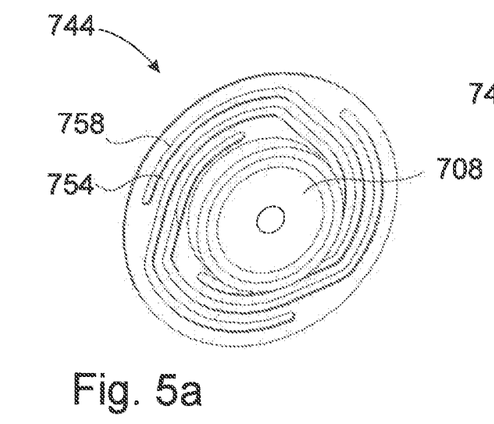
FIGS. 5a to 5f illustrate various perspective views of embodiments of the spring element of the overpressure valve.
Figure 5B:
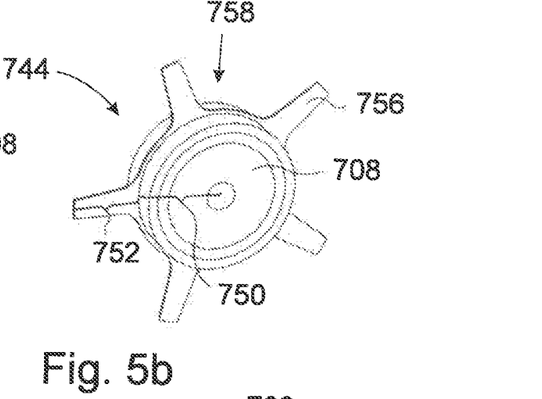
Figure 5C:
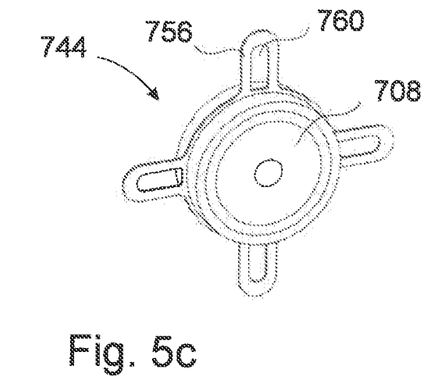
Figure 5D:
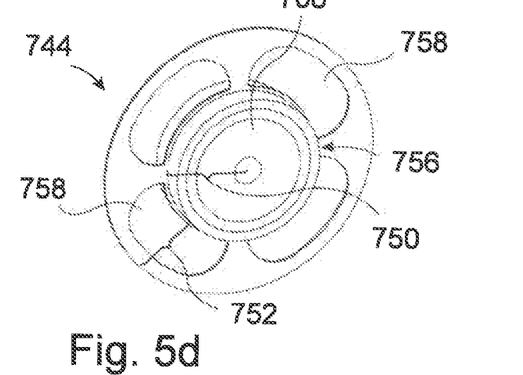
Figure 5E:
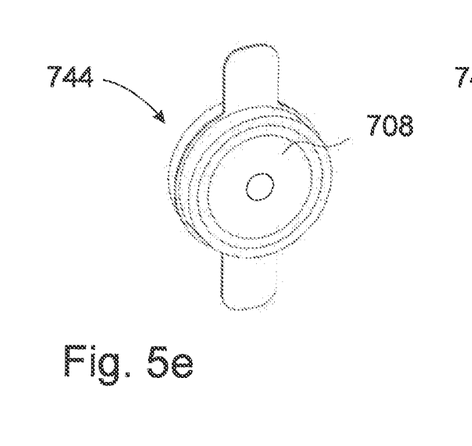
Figure 5F:
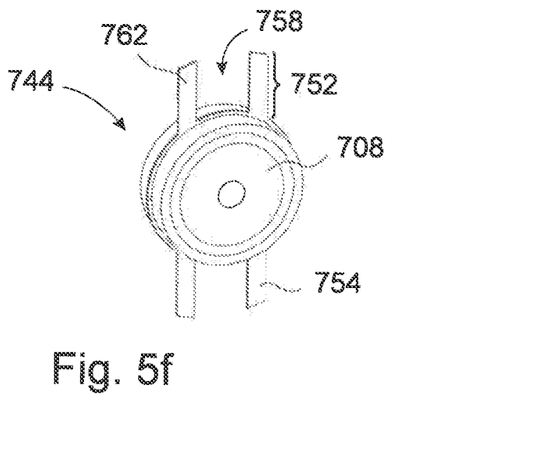

FIG. 5a shows, for example, the configuration of the spring element 744 with a meandering spring, in the case of which spiral-shaped through openings 758 adjoin resilient material webs or bridges 754 running in spiral-shaped fashion. Here, the spring travel is determined in particular by the length of said material bridges 754. For better orientation with regard to the spring element, the receiving region 750 is shown separately from the spring region 752 in FIG. 5b. The spring region 752 is situated radially at the outside and the resilient characteristic of the spring element 744 is realized primarily by said spring region 752. The receiving region 750 serves for receiving and for fastening the sealing element. In FIG. 5b, radially running radial members 756 are provided, which form the spring region 752 and between which the through openings 758 extend. FIG. 5c shows a similar construction to that in 5b, with the fastening radial members 756 in this case being arranged in a cross shape and themselves forming apertures 760. FIG. 5d shows a spring element which is of disk-like form, similarly to the "meandering spring" variant as per 5a, but also with substantially radially running resilient radial members 756 which widen in the radially outer region and which thus form the four equal-sized, equidistantly arranged through openings 758 in the circumferential direction of the spring element 8. FIG. 5e shows a two-sided, oppositely mounted configuration of the spring element 744, which is even further simplified in 5f by virtue of only four rods 762 being arranged in an H-shape and bearing the sealing element between them.

The invention is not restricted to any one of the above-described embodiments, but may be modified in a variety of ways. All of the features and advantages that emerge from the claims, from the description and from the drawing, including structural details, spatial arrangements and method steps, may be essential to the invention both individually and in a wide variety of combinations.

The invention encompasses all combinations of at least two features disclosed in the description, the claims and/or the figures.

To avoid repetitions, it is the intention that features disclosed in device terms are also disclosed, and capable of being claimed, in method terms. It is likewise the intention that features disclosed in method terms are disclosed, and capable of being claimed, in terms of the device.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

LIST OF REFERENCE DESIGNATIONS

| | | | |
|---|---|---|---|
| 1 | Locking unit | 49 | Section |
| 2 | Piston | 50 | Housing end |
| 3 | Electromagnet | 51 | Opening |
| 4 | Detent unit | 52 | Housing end |
| 5 | Housing | 53 | Shoulder |
| 6 | Middle piece | 54 | Plain bearing |
| 20 | Detent receptacle | 55 | Inner flange |
| 20a | Detent receptacle | 56 | Housing inner wall |
| 20b | Detent receptacle | 57 | Tube piece |
| 22 | Longitudinal axis | 58 | Tube outer side |
| 23 | Piston spring | 59 | End |
| 24 | Flange ring | 60 | Bearing surface |
| 25 | Piston tube | 61 | Stop surface |
| 26 | Piston thrust piece | 62 | Outer surface |
| 27 | End | 63 | Abutment shoulder |
| 28 | Connecting ring | 64 | Connecting region |
| 29 | Tube middle piece | 65 | Gap |
| 30 | Armature | 66a | Channel |
| 31 | Armature rod | 66b | Intermediate space |
| 32 | Coil body | 67 | Cutout |
| 33 | Winding | 68 | Foot region |
| 34 | Magnet housing | 70 | Pressure chamber |
| 35 | Armature space | 71 | Pressure-conducting channel |

-continued

| | | | |
|---|---|---|---|
| 36 | Magnet core | 80 | Groove |
| 37 | Base surface | 81 | Projection |
| 38 | Terminating surface | 200 | Narrowing |
| 39 | Air gap | 201 | Narrowing |
| 40 | Detent element | 202 | Tube middle piece |
| 41 | Yoke part | 203 | Connecting region |
| 42 | Interior space | 204 | Narrowing |
| 43 | Control element | 205 | Outer surface |
| 44 | End region | 206 | Outer ring |
| 45 | Bore | 207 | Pressure side |
| 47 | Through bore | 208 | Shoulder |
| 48 | Section | 730 | O-ring seal |
| 209 | Sealing ring | 732 | Overpressure opening |
| 210 | Through opening | 734 | Web |
| 211 | Half-shell | 736 | Connection |
| 212 | Circumferential groove | 738 | Bore |
| 213 | O-ring seal | 740 | Receiving space |
| 214 | Inner surface | 742 | Annular surface |
| 215a | Inner shoulder | 744 | Spring element |
| 215b | Inner shoulder | 746 | End surface |
| 300 | Magnet spring | 748 | End surface |
| 301 | Bore | 750 | Receiving region |
| 302 | Bore | 752 | Spring region |
| 400 | Cone surface | 754 | Material bridge |
| 401 | Receiving bore | 756 | Radial members |
| 402 | Interior space wall | 758 | Through opening |
| 404 | Cutout | 760 | Aperture |
| 405 | Equalization opening | 762 | Rod |
| 406 | Exterior space | 764 | Valve longitudinal axis |
| 500 | Inner wall | 766 | Run-in bevel |
| 501 | Aperture | 768 | Cone surface |
| 502 | End | | |
| 700 | Overpressure valve | | |
| 702 | Valve seat | | |
| 704 | Fluid path | | |
| 706 | Ball | | |
| 708 | Plate | | |
| 710 | Feed prechamber | | |
| 712 | Feed opening | | |
| 714 | Inlet opening | | |
| 716 | Filter element | | |
| 718 | Closure part guide element | | |
| 720 | Delimiting element | | |
| 722 | Fluid groove | | |
| 724 | Central channel | | |
| 726 | Transmission sump | | |
| 728 | Spring element | | |
| 729 | Fastening receptacle | | |

What is claimed is:

1. A locking unit for a parking lock of an automatic transmission, for locking a movement of a piston which can be acted on with hydraulic pressure, comprising:
   the piston;
   a housing;
   a tube piece contained within the housing, wherein the piston is contained within the tube piece, wherein the tube piece has an aperture formed therein;
   a pressure-conducting channel which is at least partially delimited radially to an outside, in relation to a longitudinal axis of the piston, by an inner wall of the housing, wherein the pressure-conducting channel is at least partially delimited to an inside by an outer side of the tube piece;
   a pressure chamber formed between the piston and an inside of the tube piece, wherein the pressure chamber is fluidly connected to the pressure-conducting channel via the aperture that is formed in the tube piece, wherein the pressure-conducting channel guides a pressurized medium through the aperture and into the pressure chamber for actuation of the piston; and
   at least one overpressure valve fluidically connected to the pressure-conducting channel and having a valve seat, wherein the valve seat is formed integrally with the housing, wherein the at least one overpressure valve is arranged opposite a feed opening in the housing.

2. The locking unit as claimed in claim 1, wherein the housing is formed from plastic in a section that delimits the pressure-conducting channel.

3. The locking unit as claimed in claim 1, wherein the valve seat is formed integrally with the housing by overmolding of the valve seat.

4. The locking unit as claimed in claim 1, wherein the valve seat is formed integrally with the housing by monolithic injection-molding of the valve seat.

5. The locking unit as claimed in claim 1, wherein the valve seat is formed integrally with the housing by joining of the valve seat and the housing.

6. The locking unit as claimed in claim 1, wherein the at least one overpressure valve is arranged in a fluid path for the pressurized medium downstream of a filter element for the pressurized medium.

7. The locking unit as claimed in claim 6, wherein a closure part of the at least one overpressure valve is spring-preloaded into a closed setting of the at least one overpressure valve by at least one spring element.

8. The locking unit as claimed in claim 7, wherein the at least one overpressure valve has an opening travel delimitation for the closure part.

9. The locking unit as claimed in claim 8, wherein the opening travel delimitation has a delimiting element against which the closure part can abut to limit an opening travel.

10. The locking unit as claimed in claim 9, wherein the delimiting element has a central channel running in an opening travel direction.

11. The locking unit as claimed in claim 7, wherein the at least one overpressure valve has a closure part guide element which guides the closure part along its adjustment travel.

12. The locking unit as claimed in claim 11, the closure part guide element having fluid grooves running radially on the outside in an adjustment travel direction.

13. The locking unit as claimed in claim 1, wherein the at least one overpressure valve is formed in the housing so as to be directly fluidically connected to a feed prechamber or the pressure-conducting channel.

14. The locking unit as claimed in claim 1, wherein a wall thickness of the housing is configured for hydraulic internal pressures of up to 30 bar.

15. The locking unit as claimed in claim 1, wherein a wall thickness of the housing is configured for hydraulic internal pressures of up to 25 bar.

16. The locking unit as claimed in claim 1, wherein a wall thickness of the housing is configured for hydraulic internal pressures of up to 21 bar.

17. The locking unit as claimed in claim 1, further comprising:
   a middle piece connected to the tube piece of the housing, wherein the middle piece forms a bearing surface for the piston.

18. The locking unit as claimed in claim 17, wherein the piston comprises a piston tube piece and a piston thrust piece, wherein the middle piece forms the bearing surface for the piston thrust piece.

19. The locking unit of claim 18, wherein at least part of the piston thrust piece is contained in the tube piece of the housing.

* * * * *